Patented Jan. 3, 1933

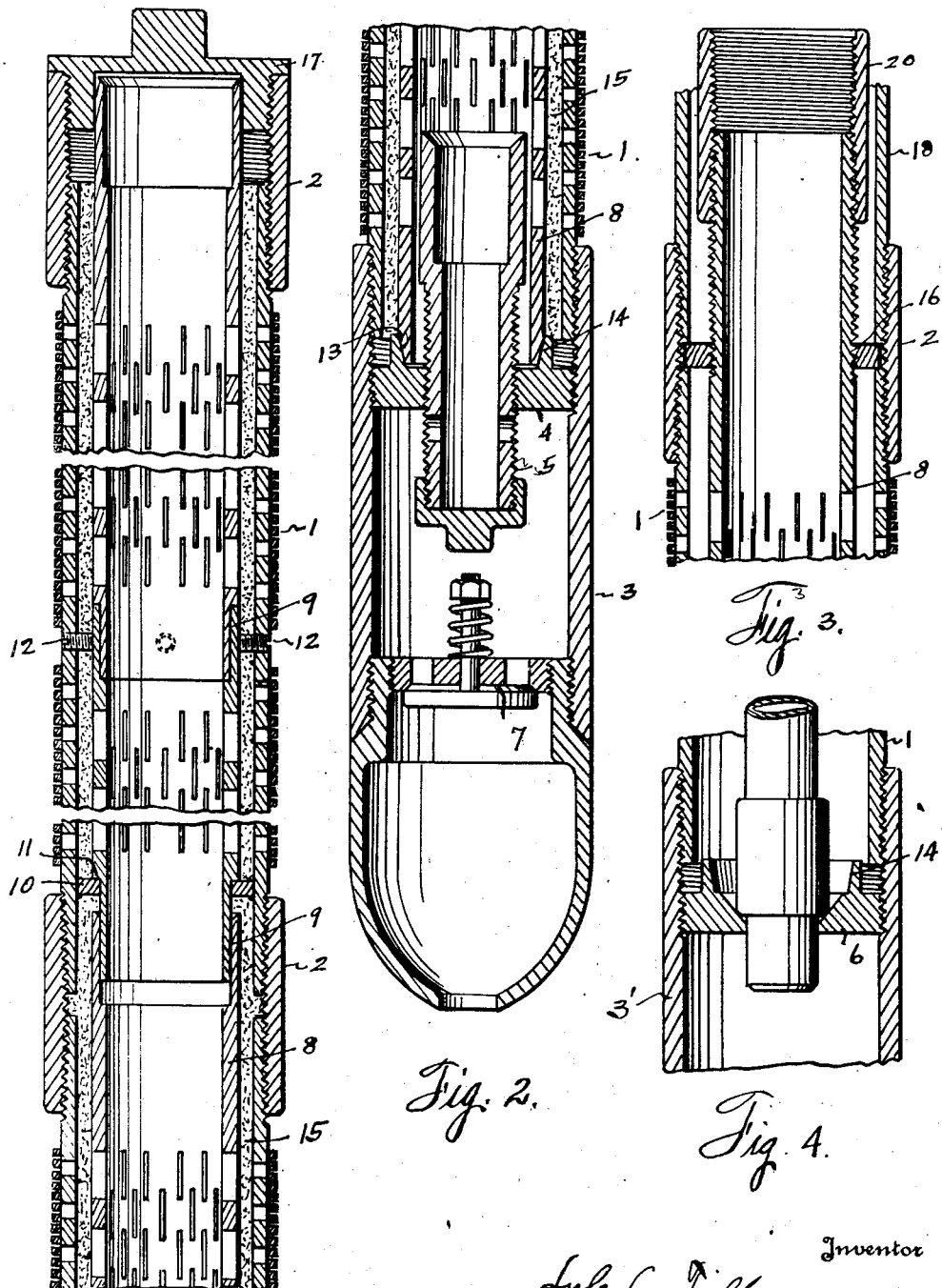

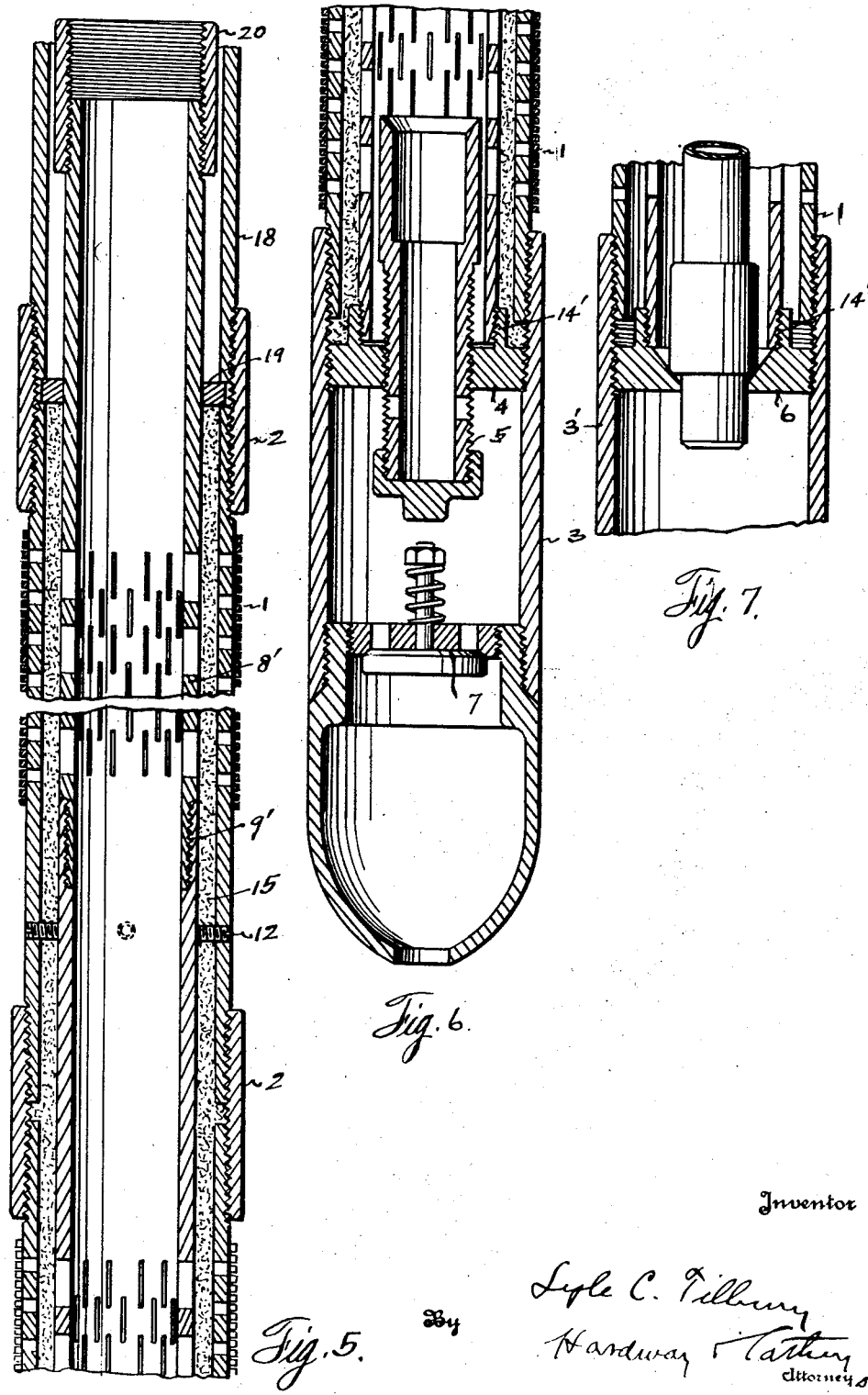

1,892,912

UNITED STATES PATENT OFFICE

LYLE C. TILBURY, OF HOUSTON, TEXAS

WELL SCREEN

Application filed November 22, 1930. Serial No. 497,364.

This invention relates to a novel well screen.

One object of the invention is to provide a screen of the character described specially designed for use in oil or gas wells and which is of such construction that it will not be readily destroyed by the erosive effect of the fine sand in the oil or gas flowing, under pressure, in to the screen.

As at present constructed well screens are made up of slitted pipe, or pipe having screening slits, or screening openings therein. These openings are of such size as to arrest the coarser sand and grit, but the finer particles thereof pass on in through the screen openings, or slits, with the fluid, which is usually under pressure, and these fine gritty particles soon enlarge the screen openings, by erosion, until the coarser sands are permitted to enter and the screen is then ruined.

It is a prime object of this invention to provide a screen having an outer screening jacket and an inner screen pipe therein and spaced therefrom, with a suitable aggregate, such as corborundum, or other suitable substance, filling the space between said jacket and screen pipe and through the interstices of which the oil or gas and fine sand may flow into the screen proper and which will not be eroded away by the action of said fine sand, and which will also arrest the coarser sands and exclude the same from the screen.

It is a further object of this invention to provide a screen structure of the character described which may be assembled in the shop, ready to be lowered into the well or whose previously constructed parts may be assembled as the screen is being lowered into the well.

A still further feature of the invention is to provide a screen of the character described of such construction that the inner screen pipe may be removed after the screen is set in the well if for any reason it be desired to remove the same, as for example when it is desired to drill deeper; and when said inner screen pipe is so removed drilling operations may be carried on through the jacket and the well deepened.

With the above and other objects in view, this invention has particular relation to certain novel features of construction, arrangement of parts and use an example of which is given in this specification and illustrated in the accompanying drawings, wherein:—

Figures 1 and 2 show vertical sectional views of the upper and lower ends, respectively of a unit of one type of the screen, as assembled and ready to be made up into a complete screen to be set in a well.

Figure 3 shows a vertical sectional view of the upper end of a completed screen of this type when assembled and set in a well bore.

Figure 4 shows a fragmentary vertical sectional view of a set shoe having a seat for supporting the lower end of the inner screen pipe.

Figures 5 and 6 show vertical sectional views of the upper and lower ends, respectively, of another type of screen embodying the same principle as that of the form shown in Figures 1 and 2, and Figure 7 shows a fragmentary vertical sectional view of another type of set shoe embodying a seat for the lower end of the inner or screen pipe.

Referring now more particularly to the drawings wherein like numerals of reference designate similar parts in each of the figures the numeral 1 designates an outer, tubular, foraminated, jacket preferably of the form of a perforated pipe wrapped with screening wire. This jacket may be formed of one, or any desired number of sections, and said sections, if more than one, may be connected together in any suitable manner as by couplings 2.

Attached to the lower end of the jacket there is a conventional type of set shoe 3, or 3′. In the set shoe 3 there is the disc like valve anchor 4 through which the valve 5 is threaded. In the set shoe 3′ there is a disc like wash pipe seat 6. In each form of set shoe there is a conventional type of back pressure valve, as 7 located beneath the valve anchor 4 or the wash pipe seat 6.

In the form shown in Figures 1 to 4 the numeral 8 designates the inner screen pipe.

This screen pipe is preferably of the slitted type as shown, although it may have any type of screening surface and it may be formed of one or more sections and if formed of more than one section the adjacent ends of adjoining sections are one reduced and the other enlarged to receive said reduced end to form a telescoping slip joint connection, as 9, between them. Some of these slip joints will fall, in assembly, approximately opposite the joints connecting sections of the outer jacket and at these joints of the screen pipe there are inside rings, as 10, welded in the jacket and on which the outside shoulder 11, formed by reducing the lower end of the inner screen pipe section above, rests. Opposite the intermediate joints 9 of the inner screen pipe there are spacers 12. These spacers may be formed of set screws which may be threaded through the jacket at spaced intervals therearound and whose inner ends abut the screen pipe 8 and hold it spaced an approximately uniform distance from the jacket all the way around and also brace the corresponding inner screen pipe joint 9.

The lower end of the inner screen pipe 8 is tapered, as at 13, and seated in an upwardly flared seat 14 of the valve anchor 4, or the wash pipe seat 6, as the case may be.

In both forms of the screen the space between the outer jacket and inner screen is filled with aggregate, preferably carborundum, or other material that will not be eroded away by the gritty fluid passing therethrough.

The form of screen shown in Figures 1 and 2 may be assembled in suitable lengths, at the plant or shop, and then lowered into the bore a length at a time and connected up in the usual way. In assembling, the carborundum, or other aggregate, is retained in the bottom length, or section, by the anchor 4 or wash pipe seat 6, as the case may be, at its lower end and by the cup 17 at its upper end; the aggregate in intermediate lengths, or sections, such as shown in Figure 1, will be retained, while the said sections are being handled, or transported, by the ring 10 and cap 17, one at the bottom and the other at the top. The aggregate will be retained in the top section, or length, such as shown in Figure 3, while the same is being transported or handled, by a ring 10 at the lower end and a flange nut 16 screwed onto the upper end of the inner, or screen pipe, and abutting the upper end of the jacket. Each section, or length, of the screen, except the upper one, shown in Figure 3, will have its upper end closed by means of a cap 17 which is screwed into the corresponding coupling 2 and which fits closely over the upper end of the corresponding screen pipe section. In letting this type of screen down into the well the lower length is lowered and held by means of the usual apparatus employed. If only one length, or section, of screen is to be used in the well, the single length or section selected should be one whose lower end has the set shoe 3 and back pressure valve assembly and whose upper end is closed by the flange nut 16 and a setting string such as 18 may be connected thereto and made up as the screen is lowered in the usual way and when the screen is set, said string may be left in the bore or detached and withdrawn.

If, in setting the screen a long screen to be composed of a number of lengths, or sections, is to be set the lower section such as shown in Figure 2 is first lowered and held suspended in the well and the cap 17 is removed therefrom and other sections such as shown in Figures 1, or 3, are then connected onto the upper end thereof, the caps 17 being removed from each section as the same is connected into the screen, and the final, or top section, as shown in Figure 3 is connected to the top of the screen thus completing the screen and said completed screen is then lowered to the bottom of the well in the usual manner, as by the string 18.

In the form shown in Figures 5 to 7 it is contemplated that the lower end of the inner screen will be screwed into the seat 14' by left hand threads and that the complete screen will be assembled as the same is let down into the bore. As the screen is made up, at the well, and let into the bore the aggregate 15 will be filled into the space between the jacket and inner screen pipe provided to receive it, at the upper end of the final, or upper, section of the screen a retaining ring 19 will be fitted over the top of the inner screen and will rest on the upper end of the jacket 1 and the setting string 18 then attached to the made up screen and said screen thereby set in the bottom of the well. The ring 19 is clamped between adjacent ends of jacket 1 and string 18. The ring 19 is provided, as will be obvious, to retain the aggregate 15 in place. It may be noted that the sections of the inner screen pipe 8' are connected by joints 9' having left hand threads and this inner screen 8' is spaced from the jacket 1 by means of the spacers 12. In each form the final upper end of the inner screen is protected by means of a coupling 20 screwed thereon.

After a screen is set in the well it is sometimes desirable to deepen the well by carrying on further drilling operations through the screen. In such case the inner screen pipe may be easily removed. If it be desired to remove this inner screen a suitable fishing tool may be lowered into the well and engaged with the screen 8 and it may be pulled out, a section at a time, and in removing said sections the rings 10, 10, may be easily broken loose and the spacers 12 sheared to permit such removal.

In removing the inner screen 8' the sections may be unscrewed by turning the fishing tool to the right and then the unscrewed sections may be readily removed.

With the inner screen pipe removed the aggregate 15 will fall down into the well and the parts 4, 5, 6, and 7 may be drilled out and drilling operations resumed through the jacket.

The drawings and description disclose what is now considered to be preferred forms of the invention by way of illustration only while the broad principle of the invention will be defined by the appended claims.

What I claim is:—

1. A well screen including an outer foraminated jacket having an annular anchor secured at the lower end thereof and provided with an upstanding seat, an inner foraminated pipe within and spaced from said jacket and whose lower end is supported by said seat, means intermediate the ends of the inner pipe for spacing said inner pipe from the jacket, and a fine, hard, granular material between said jacket and pipe.

2. A well screen including an outer jacket having a screening surface, an inner screen pipe within and spaced from the jacket, adjustable centering means on the jacket and bearing against the screen pipe, a seat adjacent the lower end of the jacket to support said pipe, said jacket and pipe being formed of sections connected by joints, the joints of the jacket being substantially opposite the joints of the screen pipe, an annular member adjacent said opposite joints between said jacket and screen pipe and on which the screen pipe section above rests, and aggregate of fine, hard, material between the jacket and screen pipe.

3. A well screen including a tubular, foraminated jacket, an inside seat adjacent the lower end thereof, an inner foraminated pipe within and whose lower end rests on said seat, hard, granular material in the space between the jacket and pipe, a removable annular member clamped between adjacent sections of said jacket and closing the space between the jacket and inner pipe.

4. A well screen including a tubular, foraminated jacket, an inner screen pipe within and spaced from said jacket and formed of detachable sections, hard, granular material filling the space between said jacket and pipe, said jacket carrying adjustable spacers for spacing the screen pipe from the jacket and means at the upper and lower ends of the screen closing the space between the jacket and pipe.

5. A well screen including an outer foraminated jacket, an inner foraminated screen pipe in, and spaced from, the jacket, a seat in the jacket closing the space between the jacket and screen pipe and on which the screen pipe rests, said screen pipe being formed of sections whose adjacent ends are connected by slip joints, spacers carried by the jacket opposite said slip joints for spacing the screen pipe from the jacket and hard granular material in the space between said jacket and pipe.

6. A well screen including an outer tubular screen pipe and an inner tubular screen pipe within and spaced from said outer pipe, hard granular material in the space between said pipes, said inner pipe being formed of detachable sections, united by slip joints and spacers carried by the outer pipe opposite said joints and bearing against said inner pipe.

7. A well screen including an outer tubular screen pipe and an inner tubular screen pipe within and spaced from said outer pipe, hard granular material in the space between said pipes, said inner pipe being formed of detachable sections, connected by left hand threads and adjustable spacers spacing the screen pipe from the jacket.

8. A well screen including an outer tubular screen pipe and an inner tubular screen pipe within and spaced from said outer pipe, hard granular material in the space between said pipes, said inner pipe being formed of detachable sections connected by flush type slip joints, and seats in the jacket closing the space between the outer and inner pipes and on which the sections of the latter above are supported.

9. A well screen including an outer tubular screen pipe and an inner tubular screen pipe within and spaced from said outer pipe, hard granular material in the space between said pipes, said inner pipe being formed of detachable sections, intermediate spacers spacing the inner screen pipe from the outer screen pipe, a seat in the jacket closing the space between the outer and inner pipes and to which the latter is connected by threads and a cap closing the upper ends of said pipes and maintaining them centered.

In testimony whereof I have signed my name to this specification.

LYLE C. TILBURY.